(12) United States Patent
Sethna et al.

(10) Patent No.: US 9,042,014 B1
(45) Date of Patent: May 26, 2015

(54) AUTOSTEREOSCOPIC DISPLAY

(75) Inventors: Vijay M. Sethna, Fremont, CA (US);
Tracy J. Barnidge, Marion, IA (US);
Bruce D. Hufnagel, Marion, IA (US);
Joseph L. Tchon, Cedar Rapids, IA (US); Birendra Bahadur, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 471 days.

(21) Appl. No.: 12/567,233

(22) Filed: Sep. 25, 2009

(51) Int. Cl.
*G02B 27/22* (2006.01)
*H04N 13/04* (2006.01)

(52) U.S. Cl.
CPC ........ *G02B 27/2264* (2013.01); *H04N 13/0427* (2013.01)

(58) Field of Classification Search
CPC .... G02B 27/20; G02B 27/22; G02B 27/2214; G02B 27/2228; G02B 27/2235; G02B 27/2242; H04N 13/0438; H04N 13/0427; H04N 13/045

USPC .......... 359/462, 464, 463; 349/15, 61, 62, 64; 362/27, 30, 600; 348/52, 55, 56
See application file for complete search history.

(56) References Cited

U.S. PATENT DOCUMENTS

| | | | |
|---|---|---|---|
| 7,061,678 B1 * | 6/2006 | Chikazawa | 359/464 |
| 7,139,042 B2 * | 11/2006 | Nam et al. | 349/15 |
| 7,518,663 B2 * | 4/2009 | Cornelissen | 349/15 |
| 7,586,681 B2 * | 9/2009 | Cernasov | 359/464 |
| 7,800,708 B2 * | 9/2010 | Brott et al. | 349/61 |

* cited by examiner

*Primary Examiner* — Audrey Y Chang
(74) *Attorney, Agent, or Firm* — Angel N. Gerdzhikov; Donna P. Suchy; Daniel M. Barbieri

(57) ABSTRACT

A method and system for autostereoscopic display of stereoscopic images may include: illuminating at least one light source; configuring a lightguide to direct light from at least one light source to a first focal point; configuring a transmissive optical display according to a first stereoscopic image of a stereoscopic image pair; configuring the lightguide to direct light from at least one light source to a second focal point; and configuring the transmissive optical display according to a second stereoscopic image of the stereoscopic image pair.

11 Claims, 10 Drawing Sheets

710 illuminating at least one light source 720 configuring a transmissive lightguide to direct light from at least one light source to a first focal point 802 configuring a first portion of the transmissive lightguide to reflect light from at least one light source at a first angle 804 configuring a second portion of the transmissive lightguide to reflect light from at least one light source at a second angle 730 configuring a transmissive optical display according to a first stereoscopic image of a stereoscopic image pair 740 configuring the transmissive lightguide to direct light from at least one light source to a second focal point 802 configuring a first portion of the transmissive lightguide to reflect light from at least one light source at a first angle 804 configuring a second portion of the transmissive lightguide to reflect light from at least one light source at a second angle 750 configuring the transmissive optical display according to a second stereoscopic image of the stereoscopic image pair

FIG. 8

710 illuminating at least one light source 720 configuring a transmissive lightguide to direct light from at least one light source to a first focal point > 902 configuring a first portion of the transmissive lightguide to reflect light from at least one light source at a first angle
>
> 904 configuring a second portion of the transmissive lightguide to reflect light from at least one light source at a second angle 730 configuring a transmissive optical display according to a first stereoscopic image of a stereoscopic image pair 740 configuring the transmissive lightguide to direct light from at least one light source to a second focal point > 902 configuring a first portion of the transmissive lightguide to reflect light from at least one light source at a first angle
>
> 904 configuring a second portion of the transmissive lightguide to reflect light from at least one light source at a second angle 750 configuring the transmissive optical display according to a second stereoscopic image of the stereoscopic image pair

FIG. 9

AUTOSTEREOSCOPIC DISPLAY

SUMMARY

A flat panel device for autostereoscopic display of stereoscopic images may include: a transmissive display device; a lightguide; and at least one light source.

A method for autostereoscopic display of stereoscopic images may include: illuminating at least one light source; configuring a lightguide to direct light from at least one light source to a first focal point; configuring a transmissive optical display according to a first stereoscopic image of a stereoscopic image pair; configuring the lightguide to direct light from at least one light source to a second focal point; and configuring the transmissive optical display according to a second stereoscopic image of the stereoscopic image pair.

BRIEF DESCRIPTION OF THE DRAWINGS

The disclosure will become more fully understood from the following detailed description, taken in conjunction with the accompanying drawings, wherein like reference numerals refer to like elements, in which Figure Reference No:

FIG. 8 illustrates a method for autostereoscopic display of stereoscopic images;

FIG. 9 illustrates a method for autostereoscopic display of stereoscopic images;

DETAILED DESCRIPTION

Figure 1:
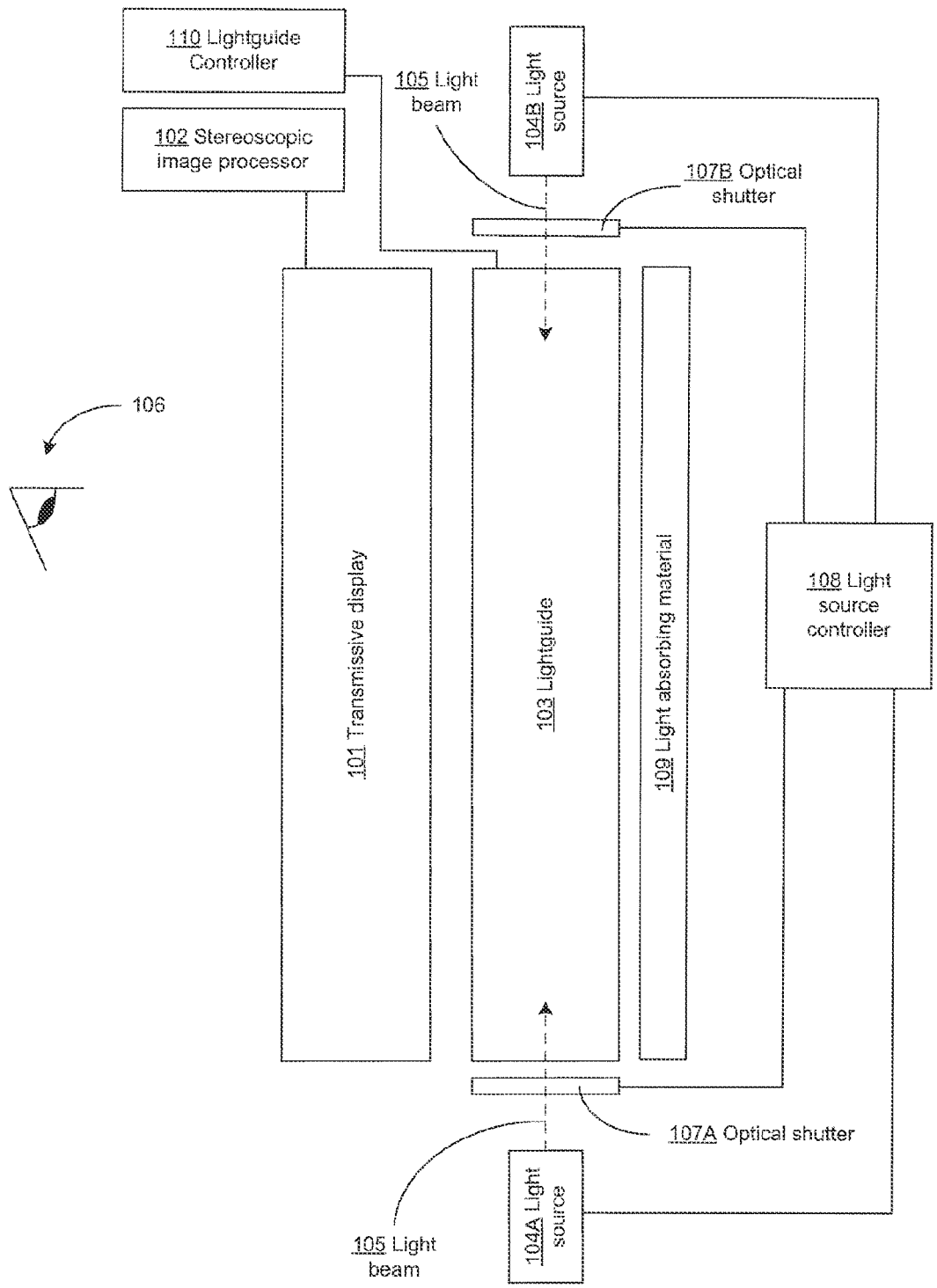
FIG. 1 illustrates a system for autostereoscopic display and viewing of stereoscopic images.

Before describing in detail the particular improved system and method, it should be observed that the invention may include, but may be not limited to a novel structural combination of conventional data/signal processing components and circuits, and not in the particular detailed configurations thereof. Accordingly, the structure, methods, functions, control and arrangement of conventional components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention may be not limited to the particular embodiments depicted in the exemplary diagrams, but should be construed in accordance with the language in the claims.

Referring to FIG. 1, an autostereoscopic 3D display system 100 is depicted. The 3D display system 100 may include a transmissive display 101 (e.g. a transmissive electro-optical device such as a liquid crystal display, an electrophoretic display, a suspended particle display, electrochromic display, and the like) which may be configured to display 3D images in the form of a stereo image pair including temporally spaced left and right images. The transmissive display 101 may be controlled by a stereoscopic image processor 102. The processor 102 may provide image data associated with a left-channel of a stereoscopic image pair and image data associated with a right-channel of a stereoscopic image pair to the transmissive display 101.

The 3D display system 100 may further include a lightguide 103 and at least one light source 104 (e.g. light source 104A and light source 104B) such as an light-emitting diode (LED), organic LED, cold cathode fluorescent lamp (CCFL), and the like. The lightguide 103 may receive a light beam 105 emitted by the light source 104 and redirect and/or transmit at least a portion of the light beam 105 towards a focal point 106 (e.g. an eye of a user viewing the 3D display system 100).

Figure 2A:
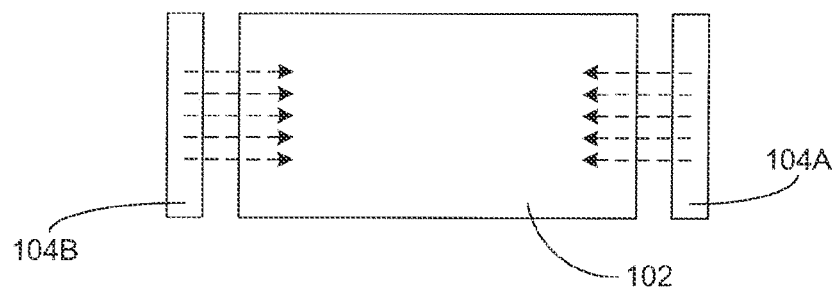
FIG. 2A illustrates a system for autostereoscopic display and viewing of stereoscopic images.
Figure 2B:
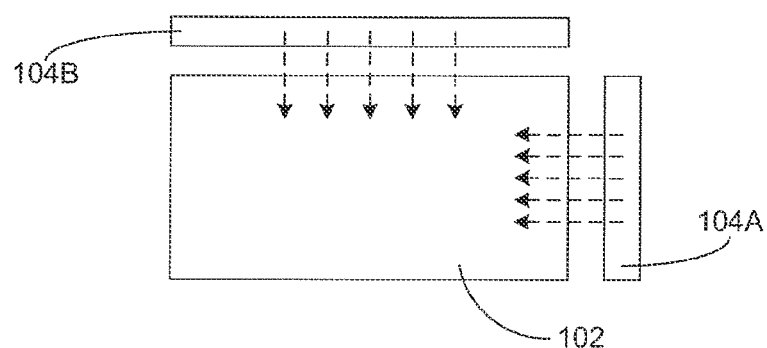
FIG. 2B a system for autostereoscopic display and viewing of stereoscopic images.
Figure 2C:
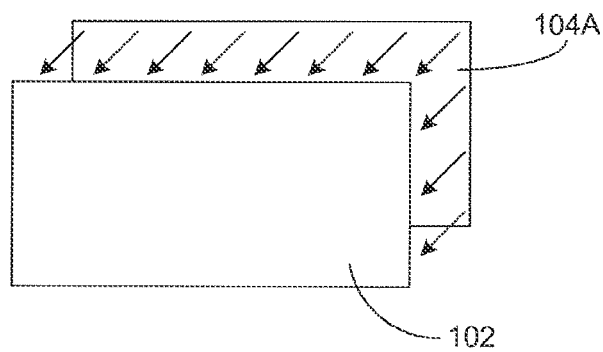
FIG. 2C a system for autostereoscopic display and viewing of stereoscopic images.

Referring to FIG. 2A-2C, various exemplary configurations for light source 104A and light source 104B are depicted with respect to the lightguide 103. Referring to 2A, light source 104A and light source 104B are shown in an opposing configuration. Referring to FIG. 2B, light source 104A and light source 104B are shown in an orthogonal configuration. Referring to 2C, a single light source 104 is shown disposed behind the lightguide 103.

Referring again to FIG. 1, the lightguide 103 may be an active media (e.g. an electro-optical lens) which may be dynamically configured by a lightguide controller 110 to direct at least a portion of the light beam 105 towards the focal point 106. For example, the lightguide 103 may include one or more micro electromechanical system (MEMS)-type switches coupled to one or more MEMS reflectors which may be actuated to alternately reflect the light beam 105 towards the focal point 106A and the focal point 106B. Alternately, the lightguide 103 may comprise a media (e.g. a composition exhibiting electrowetting characteristics) which may be configured to alternately reflect the light beam 105 towards the focal point 106A and the focal point 106B by the application of a voltage across the media.

Alternately, the lightguide 103 may be a passive media (e.g. one or more microprisims disposed within a transparent substrate) which may be statically configured to direct at least a portion of the light beam 105 towards the focal point 106.

The 3D display system 100 may further include one or more optical shutters 107 (e.g. optical shutter 107A and optical shutter 107B). The optical shutters 107 may allow the 3D display system 100 to alternate which light source 104 projects its light beam 105 into the lightguide 103. A light source controller 108 may regulate the enabling and disabling of the optical shutter 107 thereby allowing or restricting transmission of light by a light source 104. The light source controller 108 may alternately enable optical shutter 107A and optical shutter 107B thereby resulting in the alternating between light sources 104.

The 3D display system 100 may further include a light absorbing layer 109 to absorb extraneous light which may be misdirected by the lightguide 103.

Following are a description of a series of flowcharts depicting exemplary implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 7:
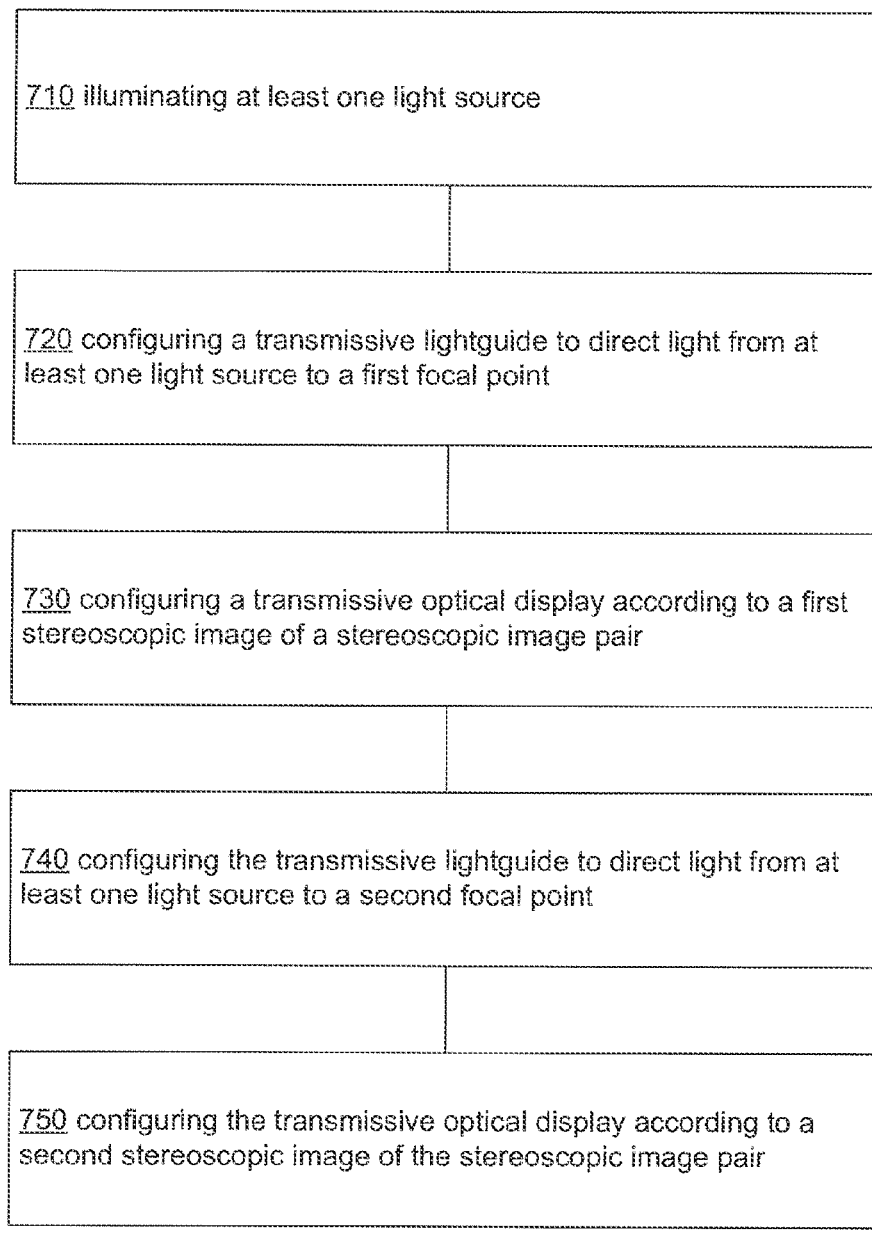
FIG. 7 illustrates a method for autostereoscopic display of stereoscopic images.

FIG. 7 illustrates an operational flow 700 representing example operations related to the autostereoscopic display of 3D images. In FIG. 7 and in following figures that include various examples of operational flows, discussion and explanation may be provided with respect to the above-described examples of FIG. 7, and/or with respect to other examples and contexts. However, it should be understood that the operational flows may be executed in a number of other environments and contexts, and/or in modified versions of FIG. 7. Also, although the various operational flows are presented in the sequence(s) illustrated, it should be understood that the various operations may be performed in other orders than those that are illustrated, or may be performed concurrently.

Operation 710 depicts illuminating at least one light source. For example, as shown in FIGS. 1-2B, the light source controller 108 may transmit a signal to at least one light source 104 (e.g. light source 104A and/or light source 104B) causing the light source 104 to emit a light beam 105. The emission of light by a light source 104 may be in a continuous manner whereby the transmission or non-transmission of the light beam 105 into the lightguide 103 is controlled by enabling or disabling an optical shutter 107. Alternately, the emission of light by a light source 104 may be in a non-continuous manner whereby the transmission or non-transmission of the light beam 105 into the lightguide 103 is controlled by enabling or disabling the light source 104 itself either independently or in combination with the use of the optical shutter 107.

Figure 3:
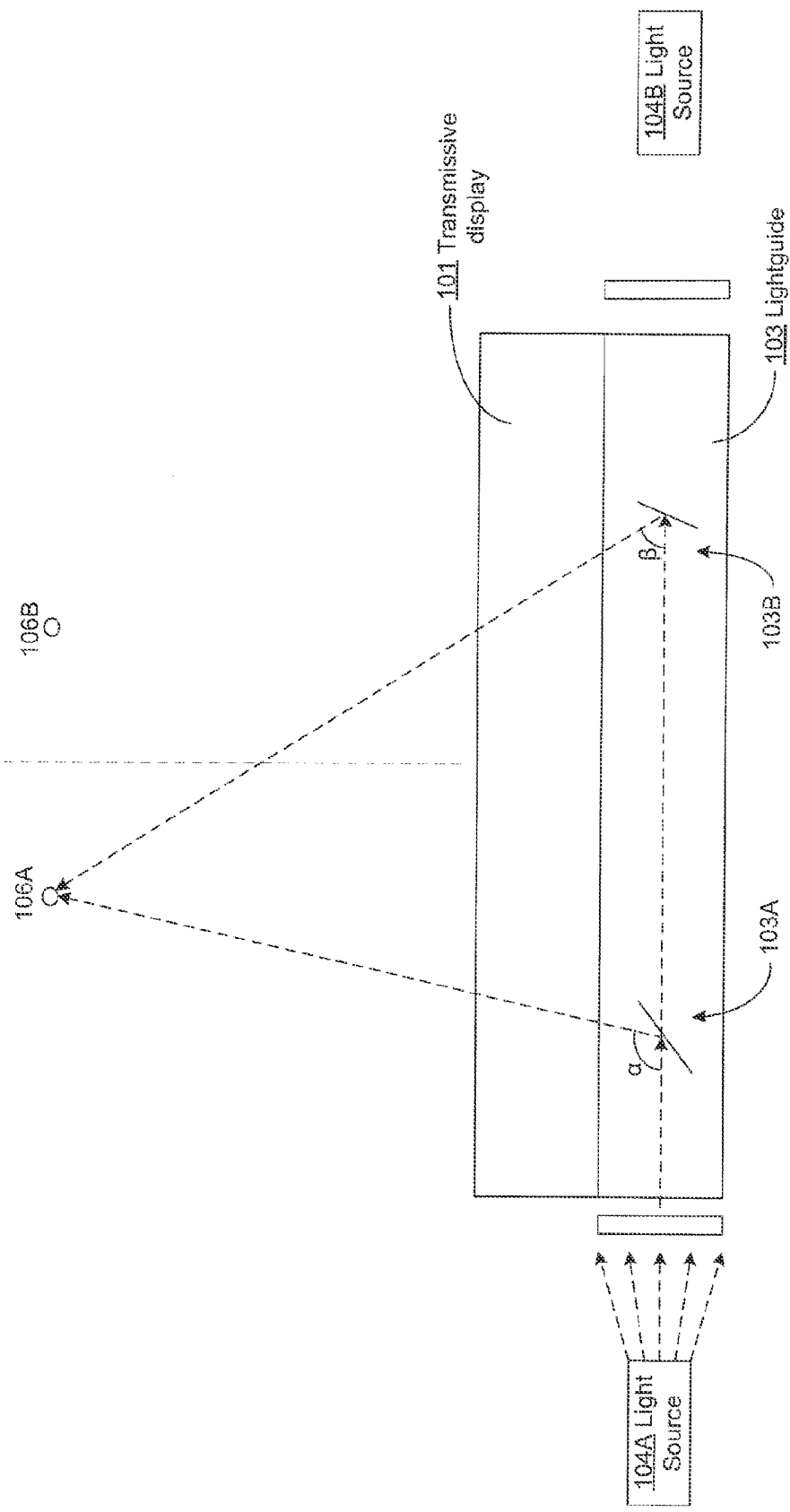
FIG. 3 illustrates a system for autostereoscopic display and viewing of stereoscopic images

Operation 720 depicts configuring a lightguide to direct light from at least one light source to a first focal point. For example, as shown in FIGS. 1-3, one or more portions of the lightguide 103 (e.g. portion 103A and/or portion 103B) may be configured to at least partially reflect incident light projected by light source 104A out of the lightguide 103 toward a focal point 106A.

Operation 730 depicts configuring a transmissive optical display according to a first stereoscopic image of a stereoscopic image pair. For example, as shown in FIG. 1, the transmissive display 101 may receive control signals from the processor 102 including a right-channel stereoscopic image of a stereoscopic image pair. The transmissive display 101 may be configured (e.g. a voltage applied across an LCD transmissive display 101) in order to display the right-channel stereoscopic image. Should the lightguide 103 be configured to project a light beam 105 toward a focal point 106A, the right-channel stereoscopic image may be viewable at focal point 106A but not at focal point 106B.

Figure 4:
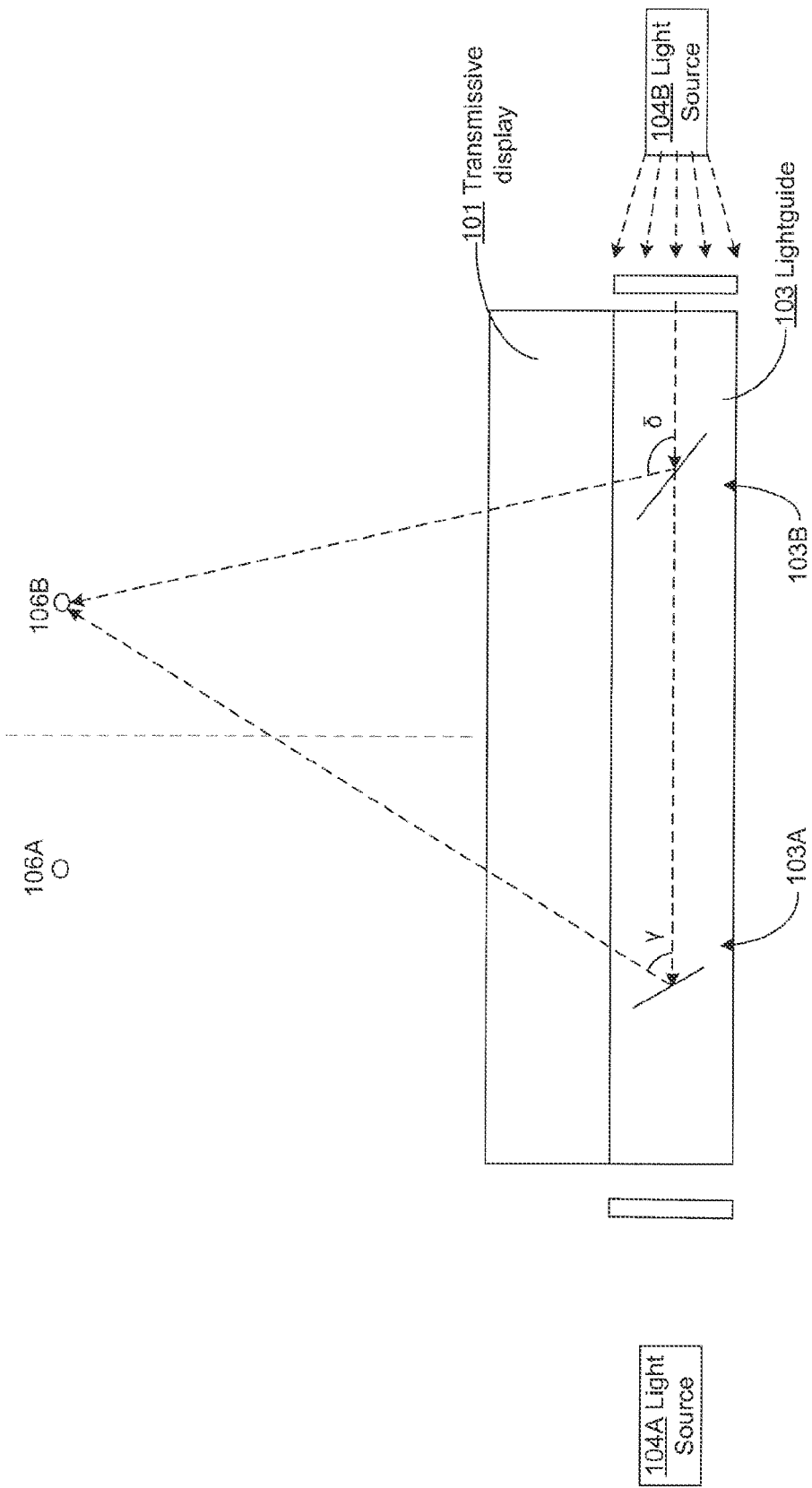
FIG. 4 illustrates a system for autostereoscopic display and viewing of stereoscopic images.
Figure 5:
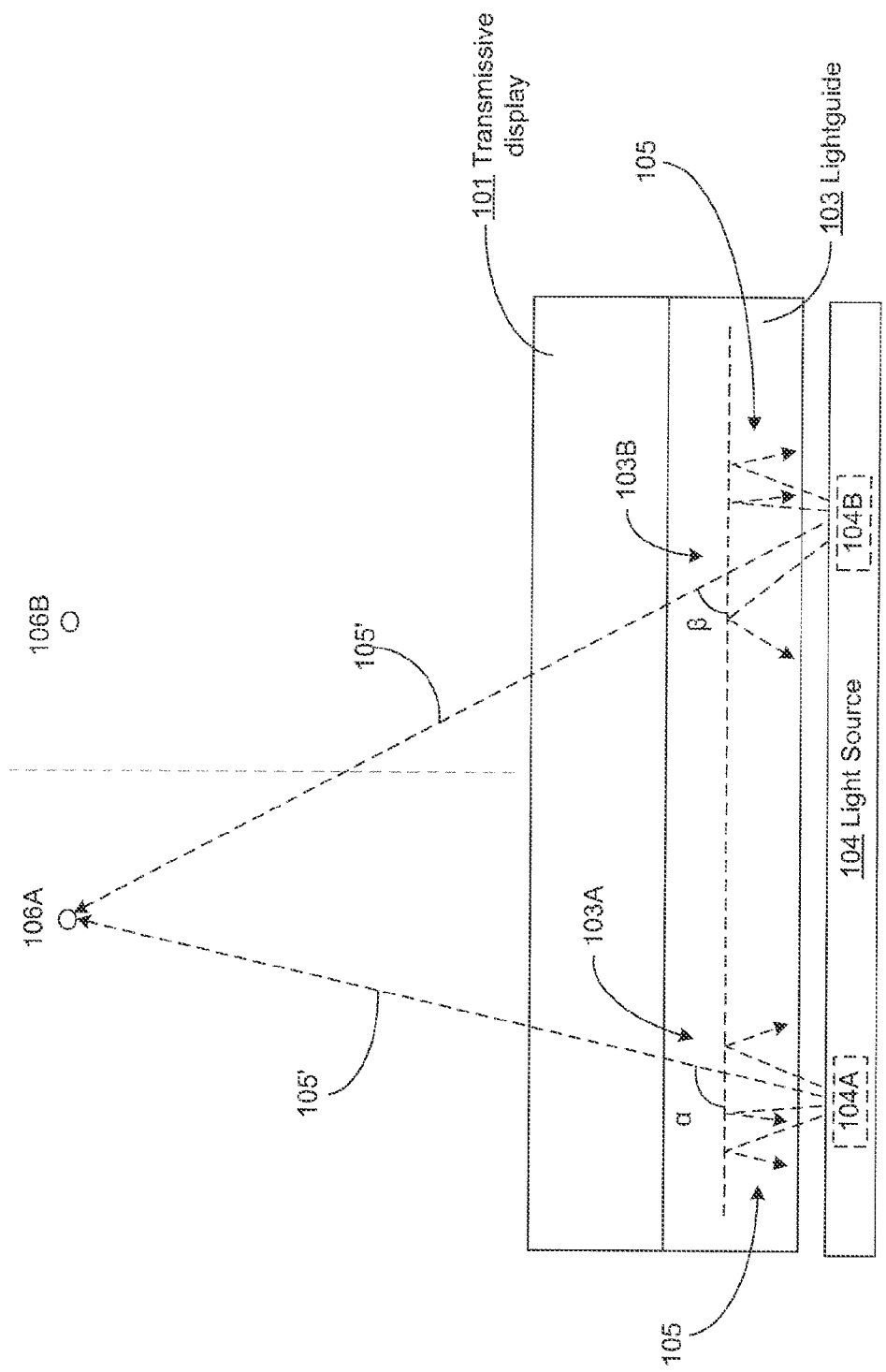
FIG. 5 illustrates a system for autostereoscopic display and viewing of stereoscopic images.
Figure 6:
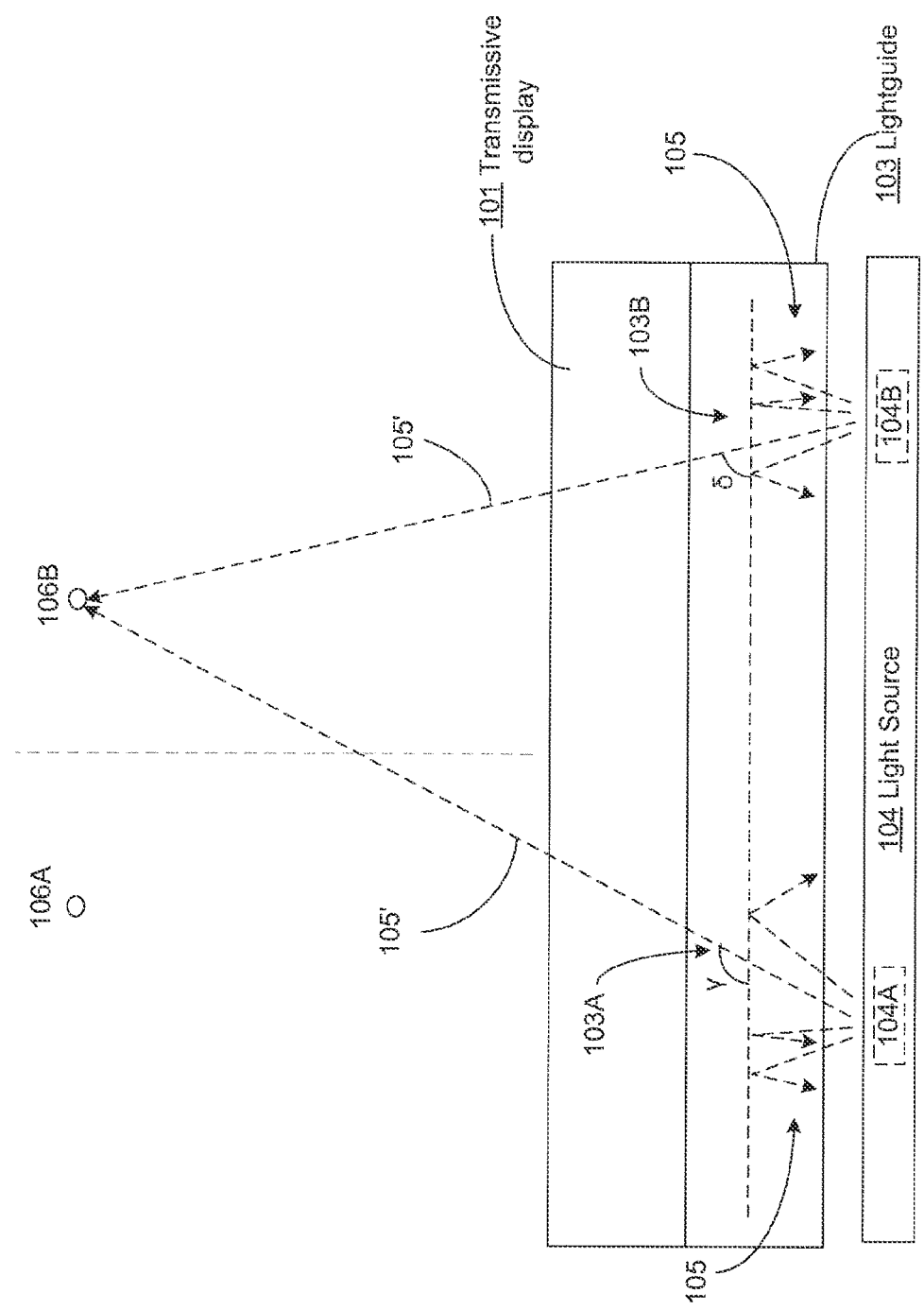
FIG. 6 illustrates a system for autostereoscopic display and viewing of stereoscopic images.

Operation 740 depicts configuring the lightguide to direct light from at least one light source to a second focal point. For example, as shown in FIGS. 1-2 and 4, one or more portions of the lightguide 103 (e.g. portion 103A and/or portion 103B) may be configured to at least partially reflect incident light projected by light source 104B out of the lightguide 103 toward a focal point 106B.

Operation 750 depicts configuring the transmissive optical display according to a second stereoscopic image of the stereoscopic image pair. For example, as shown in FIG. 1, the transmissive display 101 may receive control signals from the processor 102 including a left-channel stereoscopic image of a stereoscopic image pair. The transmissive display 101 may be configured (e.g. a voltage applied across an LCD transmissive display 101) in order to display the left-channel stereoscopic image. Should the lightguide 103 be configured to project a light beam 105 toward a focal point 106B, the left-channel stereoscopic image may be viewable at focal point 106B but not at focal point 106A.

FIG. 8 illustrates alternative embodiments of the example operational flow 700 of FIG. 7. FIG. 8 illustrates example embodiments where the operations 720 and 740 of operational flow 700 may include at least one additional operation. Additional operations may include and 802 and/or an operation 804.

Operation 802 depicts configuring a first portion of the lightguide to reflect light from at least one light source at a first angle. For example, as shown in FIGS. 1-3, a portion 103A of the lightguide 103 may be configured to at least partially reflect incident light projected by light source 104A out of the lightguide 103 toward a focal point 106A at a first angle (e.g. angle $\alpha$). Similarly, as shown in FIGS. 1-2C and 4, a portion 103A of the lightguide 103 may be configured to at least partially reflect incident light projected by light source 104B out of the lightguide 103 toward a focal point 106B at a first angle (e.g. angle $\gamma$).

Alternately, as shown in FIGS. 1-2C and 5, a portion 103A of the lightguide 103 may be configured to at least partially transmit incident light projected by a portion 104A of light source 104 out of the lightguide 103 toward a focal point 106A at a first angle (e.g. angle $\alpha$). Similarly, as shown in FIGS. 1-2C and 6, a portion 103A of the lightguide 103 may be configured to at least partially transmit incident light projected by a portion 104A of light source 104 out of the lightguide 103 toward a focal point 106B at a first angle (e.g. angle $\gamma$).

Operation 804 depicts configuring a second portion of the lightguide to reflect light from at least one light source at a second angle. For example, as shown in FIGS. 1-3, a portion 103B of the lightguide 103 may be configured to at least partially reflect incident light projected by light source 104A out of the lightguide 103 toward a focal point 106A at a second angle (e.g. angle $\beta$). Similarly, as shown in FIGS. 1-2C and 4, a portion 103B of the lightguide 103 may be configured to at least partially reflect incident light projected by light source 104B out of the lightguide 103 toward a focal point 106B at a second angle (e.g. angle $\delta$).

Alternately, as shown in FIGS. 1-2C and 5, a portion 103B of the lightguide 103 may be configured to at least partially transmit incident light projected by a portion 104B of light source 104 out of the lightguide 103 toward a focal point 106B at a second angle (e.g. angle $\beta$). Similarly, as shown in FIGS. 1-2C and 6, a portion 103A of the lightguide 103 may be configured to at least partially transmit incident light projected by a portion 104B of light source 104 out of the lightguide 103 toward a focal point 106A at a first angle (e.g. angle $\delta$).

With respect to operations 902 and 904, the lightguide 103 may be configured to collimate the light beam 105 such that only the portion of the light beam 105' which is directed to the focal point 106A or the focal point 106B may be transmitted through the lightguide 103.

Figure 10:
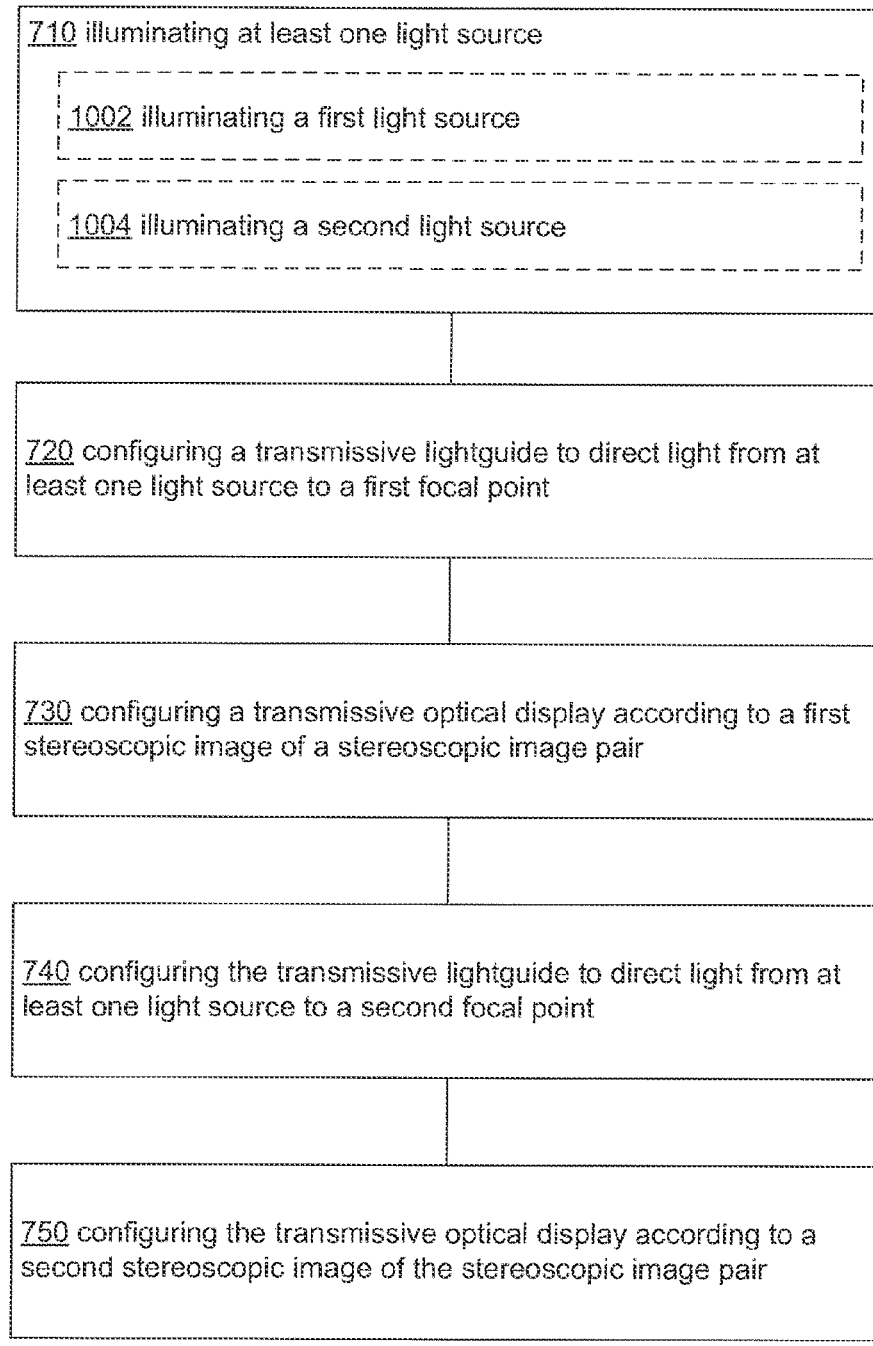
FIG. 10 illustrates a method for autostereoscopic display of stereoscopic images.

FIG. 10 illustrates alternative embodiments of the example operational flow 700 of FIG. 7. FIG. 10 illustrates example embodiments where the operation 710 of operational flow 700 may include at least one additional operation. Additional operations may include and 1002 and/or an operation 1004.

Operation 1002 depicts illuminating a first light source. For example, as shown in FIGS. 1 and 3, the light source controller 108 may transmit a signal to the light source 104A causing the light source 104A to emit a light beam 105.

Operation 1004 depicts illuminating a second light source. For example, as shown in FIGS. 1 and 4, the light source controller 108 may transmit a signal to the light source 104B causing the light source 104B to emit a light beam 105.

As described above, the illumination of the light source 104A and the light source 104B may correspond with the display of a right-channel stereoscopic image and a left-channel stereoscopic image, respectively, by the transmissive display 101 so as to direct the light originating from the light source 104A to focal point 106A when the right-channel stereoscopic image is displayed and light originating from the light source 104B to focal point 106B when the left-channel stereoscopic image is displayed.

The illumination of the light source 104A and the light source 104B may be conducted in an alternating sequence to correspond with an alternating display of right-channel and left-channel stereoscopic images. This alternation between light source 104A and the light source 104B may occur at a given frequency (e.g. 72 Hz). In order to direct the light from the light source 104A and the light source 104B to the focal point 106A and the focal point 106B respectively, the light-guide 103 may be reconfigured at a frequency that is twice that of the alternation between light source 104A and the light source 104B (e.g. 144 Hz)

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into high-level descriptor languages (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a solid state storage device (e.g. a USB drive), etc.; and a transmission type medium such as a digital and/or an analog communication medium (e.g., a fiber optic cable, a waveguide, a wired communications link, a wireless communication link (e.g., transmitter, transceiver, transmission logic, reception logic, etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to" or other past-tense adjectives are generally not intended to exclude such variants, unless context dictates otherwise.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

What is claimed is:

1. A method of displaying stereoscopic images comprising:
   opening a first shutter associated with a first light source during a first time period and closing a second shutter associated with a second light source during the first time period; and
   closing the first shutter associated with the first light source during a second time period and opening the second shutter associated with the second light source during the second time period;
   configuring a first portion of an electro-optical device to direct light from the first source at a first angle during a first time period while configuring a second portion of the electro-optical device to direct light from the first light source at a second angle during the first time period; and
   configuring the first portion of the electro-optical device to direct light from the second light source at a third angle while configuring the second portion of the electro-optical device to direct light from the second light source at a fourth angle during the second time period;
   configuring a transmissive optical display to display a first stereoscopic image of a stereoscopic image pair during the first time period;
   configuring the transmissive optical display to display a second stereoscopic image of the stereoscopic image pair during the second time period.

2. The method of claim 1, further comprising: at least partially collimating light from the at least one of: the first light source and the second light source.

3. The method of claim 1, wherein the electro-optical device includes one or more micro electromechanical system (MEMS)-type switches coupled to one or more MEMS reflectors.

4. The method of claim 1, wherein the electro-optical device includes a composition exhibiting electrowetting characteristics configurable by an application of a voltage.

5. A system of displaying stereoscopic images comprising:
   at least one computing device programmed for:
   opening a first shutter associated with a first light source during a first time period and closing a second shutter associated with a second light source during the first time period;
   closing the first shutter associated with the first light source during a second time period and opening the second shutter associated with the second light source during the second time period;
   configuring a first portion of an electro-optical device to direct light from the first source at a first angle during a first time period while configuring a second portion of the electro-optical device to direct light from the first light source at a second angle during the first time period;
   configuring the first portion of the electro-optical device to direct light from the second light source at a third angle while configuring the second portion of the electro-optical device to direct light from the second light source at a fourth angle during the second time period;
   configuring a transmissive optical display to display a first stereoscopic image of a stereoscopic image pair during the first time period; and
   configuring the transmissive optical display to display a second stereoscopic image of the stereoscopic image pair during the second time period.

6. The system of claim 5, further comprising:
   means for at least partially collimating light from the at least one of: the first light source and the second light source.

7. The system of claim 5, wherein the electro-optical device includes one or more micro electromechanical system (MEMS)-type switches coupled to one or more MEMS reflectors.

8. The system of claim 5, wherein the electro-optical device includes a composition exhibiting electrowetting characteristics configurable by an application of a voltage to the composition.

9. A stereoscopic image display device comprising:
   a transmissive display device configured to:
      display a first stereoscopic image of a stereoscopic image pair during a first time period, and
      display a first stereoscopic image of a stereoscopic image pair during a second time period;
   a first light source;
   a second light source;
   a shutter controller configured for:
      opening a first shutter associated with a first light source during a first time period and closing a second shutter associated with a second light source during the first time period;
      closing the first shutter associated with the first light source during a second time period and opening the second shutter associated with the second light source during the second time period; and an electro-optical device controller configured for:

configuring a first portion of an electro-optical device to direct light from the first source at a first angle during a first time period while configuring a second portion of the electro-optical device to direct light from the first light source at a second angle during the first time period;

configuring the first portion of the electro-optical device to direct light from the second light source at a third angle while configuring the second portion of the electro-optical device to direct light from the second light source at a fourth angle during the second time period.

10. The stereoscopic image display device of claim 9, wherein the electro-optical device includes one or more micro electromechanical system (MEMS)-type switches coupled to one or more MEMS reflectors.

11. The stereoscopic image display device of claim 9, wherein the electro-optical device includes a composition exhibiting electrowetting characteristics configurable by an application of a voltage to the composition.

\* \* \* \* \*